Jan. 1, 1963     C. A. GLENN ETAL     3,071,345
THROTTLE VALVE
Filed April 27, 1961
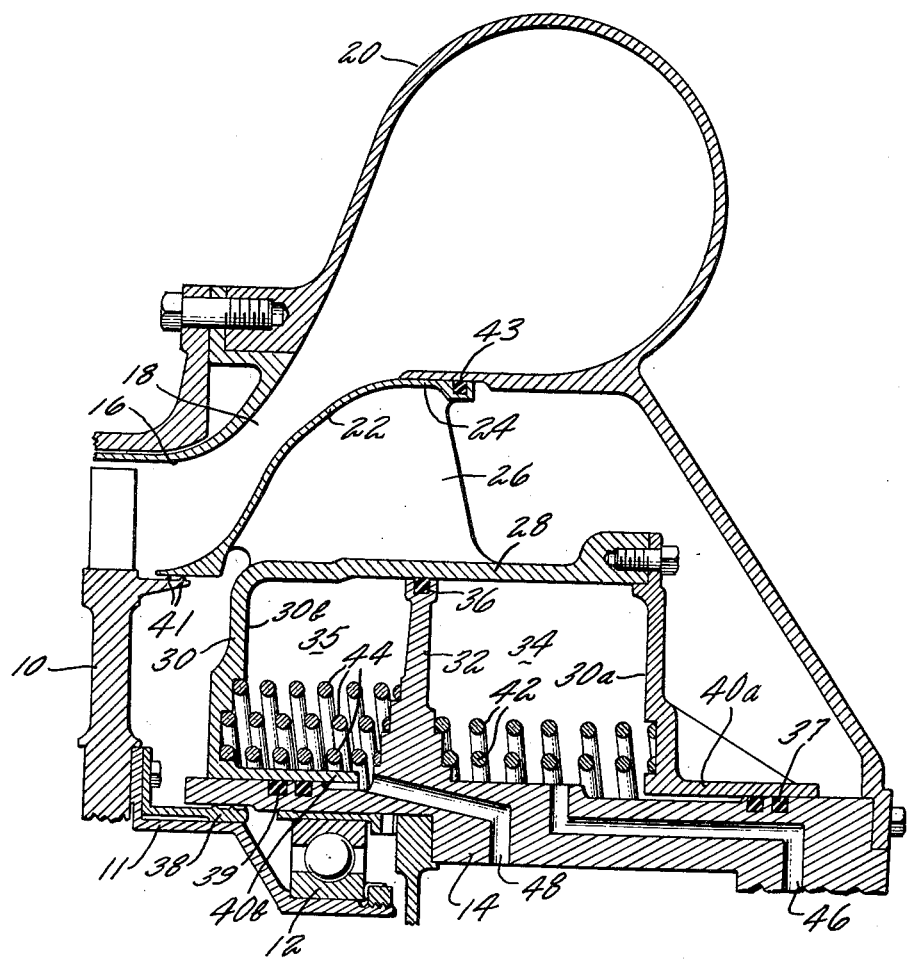
INVENTORS
CHARLES A. GLENN
FRANK W. REICHENBACHER
BY David S. Fishman
AGENT

United States Patent Office 3,071,345
Patented Jan. 1, 1963

3,071,345
THROTTLE VALVE
Charles A. Glenn, West Hartford, and Frank W. Reichenbacher, Windsor, Conn., assignors to United Aircraft Corporation, East Hartford, Conn., a corporation of Delaware
Filed Apr. 27, 1961, Ser. No. 106,096
1 Claim. (Cl. 253—59)

This invention relates to a turbopump. More particularly it relates to the use of a throttle valve downstream of the turbine to control the flow of fluid through the turbine.

In many instances it is desirable to control turbine flow by means of a valve located downstream of the turbine. In the past, this has been accomplished by such devices as a butterfly valve in the turbine discharge passage and other types of variable area restrictions across the discharge passage. These devices have all resulted in losses as the turbine fluid passes through the restricting orifice. This is particularly so in view of the fact that the driving fluid leaves the turbine with a substantial tangential velocity and the flow is disrupted by the use of orifice restricting devices which extend across the discharge passage.

The present invention provides a simple and efficient apparatus for controlling turbine flow by varying the area of the discharge passage without incurring large losses. In accordance with the present invention an annular passage is provided for turbine discharge flow, and the inner wall of the annular passage forms a throttle valve which is moved to vary the passage area and control turbine flow. In this manner the tangential flow of turbine discharge gases is not disrupted and the losses normally associated with orifice type devices are avoided.

The valve has an annular cross-section corresponding to the flow section of the turbine exhaust. The valve proper is an axially movable inner wall of the turbine exhaust duct leading to the collection scroll. It is contoured in conjunction with the fixed outer wall of the duct such that as the valve moves the flow passage approximates the passage through a converging-diverging nozzle having a throat area proportional to valve position. A scroll forms the major diverging portion of the converging-diverging passage formed by the valve. Thus, the combination of the contoured valve surface and the scroll results in a low loss valve, permitting close control of the turbine without disrupting the smooth flow of the discharge from the last stage of the turbine to the outlet pipe.

Accordingly, one feature of the present invention is the use of a movable annular member to vary the area of a turbine discharge flow passage.

Another feature of the present invention is a turbine discharge passage, one wall of which consists of an extension of the turbine casing and the other wall of which consists of a movable annular member.

Still another feature of the present invention is a turbine discharge passage, the inner wall of which is movable to vary the passage area and which has a flange extending therefrom to form part of the scroll which communicates with the passage.

Still another feature of the present invention is a valve downstream of the turbine for varying the flow through the turbine while at the same time maintaining the pressure level of the fluid downstream of the turbine sufficiently high to be useful for further applications.

Other features and advantages will be apparent from the specification and claim, and from the accompanying drawing which illustrates an embodiment of the invention.

The single FIGURE is a cross-sectional view of an installation incorporating the present invention.

In the drawing a turbine 10 is rotatably mounted through rotor 11 and bearing 12 which in turn is mounted on support 14. Annular casing 16 surrounds the turbine and extends downstream of the turbine to form the outer wall of the turbine discharge passage 18. Scroll 20 is attached to casing 16, and passage 18 communicates with scroll 20. An annular member 22 extends between turbine 10 and scroll 20 and is a throttle valve which forms the inner wall of discharge passage 18. A flange 24 extends from member 22 and forms part of scroll 20 to provide a continuous path along member 22 and into scroll 20.

Annular member 22 is connected by struts 26 to sleeve 28 which forms part of annular piston 30. An annular flange 32 extends from support 14 to sleeve 28 to form chambers 34 and 35 for loading the faces 30a and 30b, respectively, of piston 30. Seal 36 prevents leakage between chambers 34 and 35, and seals 37 and 39 prevent leakage of piston actuating fluid out of chambers 34 and 35, respectively. Seals 38, 41 and 43 also prevent leakage of the turbine motive gases. Sleeves 40a and 40b extending from faces 30a and 30b, respectively, form part of piston 30 and are slidably mounted on support 14. Springs 42 urge piston 30 to the right and springs 44 oppose springs 42 and urge piston 30 to the left. The force of springs 44 is larger than the force of springs 42 and piston 30 is normally urged to the left by this excess force. Actuating pressure is admitted to chamber 34 through line 46 to move piston 30 to the right, and through line 48 to chamber 35 to move piston 30 to the left.

The introduction of actuating pressure into chamber 34 or chamber 35 will cause movement of piston 30, the amount of movement being in part a function of the pressure in chamber 35 or chamber 34 and the forces of springs 42 and 44. As can readily be seen, any movement of piston 30 is accompanied by a corresponding movement of annular member 22. Annular member 22 constitutes a throttle valve to control the cross-sectional area of the discharge passage 18. Varying the area of discharge passage 18 in this manner provides a simple and efficient means for varying the flow through the turbine 10 and hence the turbine output. High losses are avoided because the tangential turbine discharge flow is not disrupted, and the need for high loss orifice devices is eliminated. Thus the pressure level of the fluid in scroll 20 is substantially higher than would ordinarily be the case and this high pressure can be usefully employed for the purpose of powering auxiliary devices such as vectoring or steering nozzles on a propulsion vehicle.

The double acting actuator piston 30 positions the valve in response to the differential pressure in chambers 34 and 35 applied across the actuator piston area. Valve 22 is loaded by turbine discharge pressure acting on the valve surface and by the difference between the loads exerted by opposed springs 42 and 44. As the turbine discharge flows through the valve, the pressure acting normal to the valve surface varies directly with the pressure level of the engine and inversely as a function of the fluid velocity through the valve. As a result, there exists a pressure profile across the valve surface which varies with valve opening. This variation is essentially linear through a range encompassing the design value of valve opening. In the absence of the pressure loading on the valve face and the differential pressure across the actuator piston, the opposing springs will move the valve until their loads are equal. In the absence of only the piston differential pressure, the springs will move the valve until their net load equals the pressure loading on the face of the valve. The first of these balance points corresponds to an engine start valve position; the second is the throttle setting that would result from a loss of servo supply pressure.

The relative spacing of these points and their specific locations are determined by the ratio of the spring rates of the opposing springs and their combined rate relative to the effective area of the valve face.

It is to be understood that the invention is not limited to the specific embodiment herein illustrated and described but may be used in other ways without departure from its spirit as defined by the following claim.

We claim:

In combination a turbine, means supporting said turbine for rotation about an axis, an annular casing surrounding said turbine and extending downstream of said turbine, a scroll attached to said casing downstream of said turbine, an annular member extending between said turbine and said scroll and sealably engaging each to be translatable with respect thereto along said axis and cooperating with said casing to form an annular discharge passage between said turbine and said scroll, said casing, scroll and annular member being of circular cross-section and supported by said support means concentrically about said axis, and means for translating said annular member to vary the area of said discharge passage including a fixed annular flange extending from said support means, and further including an annular movable piston enveloping and extending on each side axially of said annular flange and having opposite ends sealably engaging said support means for translation with respect thereto along said axis so that said flange and piston cooperate with said support means to form a sealed chamber on opposite sides of said flange, and still further including pressure conduits leading to and communicating with each of said chambers so that pressurized fluid may selectively be provided to said chambers to cause said piston to translate with respect to said axis, and still further including means connecting said piston to said annular member so that translation of said piston causes translation of said annular member, and still further including springs in each of said chambers extending between said flange and said piston opposite ends and selected to urge said piston to move and said annular member to reduce the area of said annular discharge passage until overpowered by the pressurized fluid in said chambers.

References Cited in the file of this patent
UNITED STATES PATENTS

| | | |
|---|---|---|
| 872,377 | Samuelson | Dec. 3, 1907 |
| 1,322,810 | Moody | Nov. 25, 1919 |
| 2,285,976 | Huitson | June 9, 1942 |
| 2,431,398 | Hasbrouck | Nov. 25, 1947 |
| 2,787,126 | Kleczek | Apr. 2, 1957 |
| 2,980,394 | Rowlett et al. | Apr. 18, 1961 |
| 2,996,996 | Jassniker | Aug. 22, 1961 |

FOREIGN PATENTS

| | | |
|---|---|---|
| 285,815 | Great Britain | May 17, 1928 |
| 83,600 | Netherlands | Dec. 15, 1956 |